United States Patent
Hirota et al.

(10) Patent No.: US 12,139,118 B2
(45) Date of Patent: Nov. 12, 2024

(54) SAFE PARKING SYSTEM

(71) Applicant: GKN Automotive Limited, Birmingham (GB)

(72) Inventors: Isao Hirota, Tochigi (JP); Takahiro Nagaoka, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 216 days.

(21) Appl. No.: 18/063,102

(22) Filed: Dec. 8, 2022

(65) Prior Publication Data
US 2023/0104316 A1 Apr. 6, 2023

Related U.S. Application Data

(63) Continuation of application No. PCT/JP2020/025489, filed on Jun. 29, 2020.

(51) Int. Cl.
| | |
|---|---|
| B60K 23/04 | (2006.01) |
| B60T 17/22 | (2006.01) |
| F16H 48/20 | (2012.01) |
| F16H 48/24 | (2006.01) |
| F16H 48/34 | (2012.01) |

(52) U.S. Cl.
CPC .............. B60T 17/22 (2013.01); B60K 23/04 (2013.01); *B60K 2023/046* (2013.01); *B60T 2201/14* (2013.01); *F16H 2048/204* (2013.01); *F16H 48/24* (2013.01); *F16H 2048/346* (2013.01)

(58) Field of Classification Search
CPC .......... F16H 48/20; F16H 48/24; F16H 48/34; F16H 2048/204; F16H 2048/346; B60K 23/04; B60K 2023/046; B60T 17/22; B60T 2201/14
See application file for complete search history.

(56) References Cited

U.S. PATENT DOCUMENTS

| | | | |
|---|---|---|---|
| 2010/0255947 A1* | 10/2010 | Povirk | F16H 48/30 475/150 |
| 2018/0306297 A1* | 10/2018 | Komatsu | B22D 25/02 |
| 2021/0284018 A1* | 9/2021 | Ishii | B60K 23/08 |

FOREIGN PATENT DOCUMENTS

| | | |
|---|---|---|
| JP | S64-30836 A | 2/1989 |
| JP | H03-129150 A | 6/1991 |
| (Continued) | | |

OTHER PUBLICATIONS

International Search Report and Written Opinion for PCT/JP2020/025489 mailed Sep. 15, 2020 (9 pages; with English translation).

*Primary Examiner* — Timothy Hannon
(74) *Attorney, Agent, or Firm* — Reising Ethington P.C.

(57) ABSTRACT

A safe parking system is provided with: a torque-generating motor; a final drive including side gears drivingly coupled with the motor, a differential gear with a lock to prevent a differential motion between the side gears and an actuator for releasing the lock; an ignition key having an ON position and an OFF position; a differential-lock switch having an open position and a closed position; a switching unit for selecting whether the actuator is turned on or off; and a controller configured to, when the ignition key is detected to be in the OFF position, turn off the actuator if the differential-lock switch is in the open position, and execute no operation about the actuator if the differential-lock switch is in the closed position.

4 Claims, 4 Drawing Sheets

(56) References Cited

FOREIGN PATENT DOCUMENTS

| | | |
|---|---|---|
| JP | 2016-188691 A | 11/2016 |
| JP | 2018-200093 A | 12/2018 |
| WO | 2018008160 A1 | 1/2018 |

* cited by examiner

SAFE PARKING SYSTEM

CROSS-REFERENCE TO RELATED APPLICATIONS

This application is a continuation application of, and as such claims priority to, PCT International Application No. PCT/JP2020/025489 (filed Jun. 29, 2020), the entire contents of which are incorporated herein by reference in their entirety.

BACKGROUND

Technical Field

The disclosure herein relates to a system for safely parking a vehicle, including to a safe parking system using differential-locking by a differential gear to secure immobility of a vehicle.

Background

A vehicle in many cases is, for the purpose of a remaining stopped, e.g., parking, equipped with a parking brake independent of a foot brake. A conventional example of a parking brake is a mechanical system having drum brakes respectively provided for right and left rear wheels, which are put in operation by wire cables. In this example, as the wheels are directly braked and any backup means such as a battery is not necessary, the vehicle could enjoy good reliability. Another example is a dog clutch or a pawl equipped in a transmission for keeping gears from rotating. The latter example may potentially have an issue as it does not directly brake the wheels. More specifically, while the right and left wheels are coupled to each other via a differential gear for allowing difference in rotational speed between the wheels, the wheels could therefore rotate in the counter directions even when parked, and in some situations the vehicle could lose its stationary state and move or turn.

PCT International Publication WO 2018/008160 A1 and Japanese Patent Application Laid-open No. 2018-200093 disclose related art.

SUMMARY

Prior parking brakes are not preferred in the field of light-weight vehicles such as micro-cars or buggies as they inevitably result in weight gain for securing safety parking. The system disclosed hereinafter has been created to assist in securing a parked vehicle in a manner not dependent on means for locking wheels.

According to an aspect, a safe parking system is provided with: a motor creating a torque for driving a vehicle; a final drive including side gears so coupled with the motor as to output the torque to respective driving wheels, and including a differential gear with a lock to prevent a differential motion between the side gears and an actuator for releasing the lock; an ignition key having an ON position and an OFF position; a differential-lock switch having an open position and a closed position; a switching unit for selecting whether the actuator is turned on or off; and a controller electrically connected to the ignition key, the differential-lock switch and the switching unit to control the actuator, the controller configured to, when the ignition key is detected to be in the OFF position, turn off the actuator if the differential-lock switch is in the open position and execute no operation of the actuator if the differential-lock switch is in the closed position, whereby the differential motion of the differential gear is locked in either case to secure the vehicle in a stopped or parked position.

DESCRIPTION OF EXAMPLE EMBODIMENTS

Exemplary embodiments will be described hereinafter with reference to the appended drawings. In the following description, distinctions between right and left are provided only for convenience of explanation. Examples where the right and the left, or the front and the rear, are reversed could occur, of course.

A system of the present embodiment can be applied to any relatively light-weight vehicle such as three-wheeled scooters, golf carts, microcars or buggies, and particularly to battery-driven electric vehicles. Of course it's also applicable to ground vehicles generally, including four- or more-wheeled vehicles. Although the following descriptions relate to an example of a rear-wheel driven four-wheel vehicle where an electric motor is directly coupled with a final drive, it is only for explanatory convenience.

Figure 1:
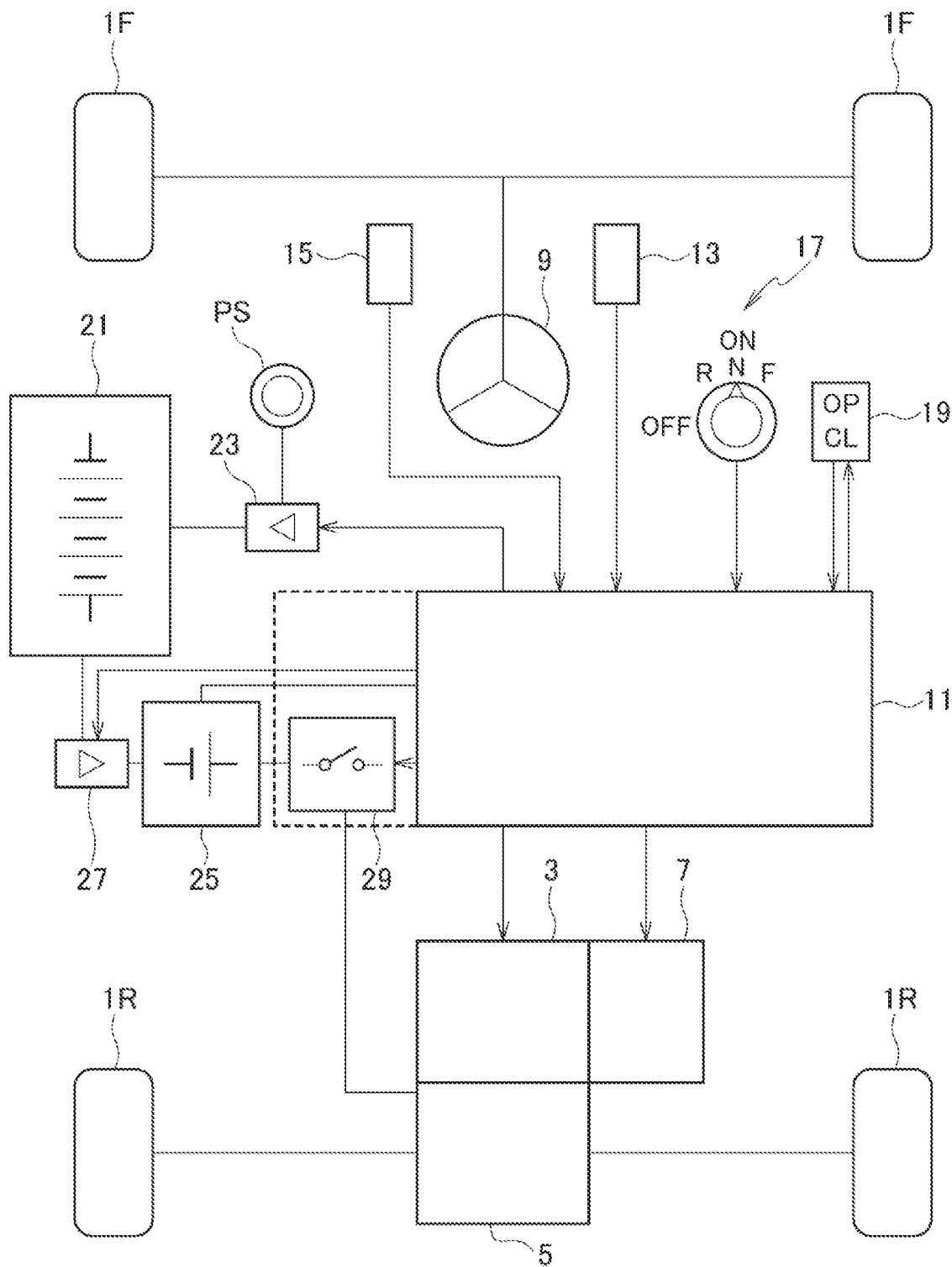
FIG. 1 is a block-diagram of a system.

Referring to FIG. 1, a vehicle is provided with front wheels 1F and, as driving wheels, rear wheels 1R. The front wheels 1F are coupled with a steering wheel 9 and a driver is thus allowed to steer the steering wheel 9 to change the traveling direction of the vehicle. The rear wheels 1R are drivingly coupled to a motor 3 via a final drive 5 and thereby receive its torque to thrust the vehicle forward or backward. The final drive 5, as will be described later, has a differential gear built-therein to differentially distribute the torque to the right and left rear wheels 1R.

Figure 2:
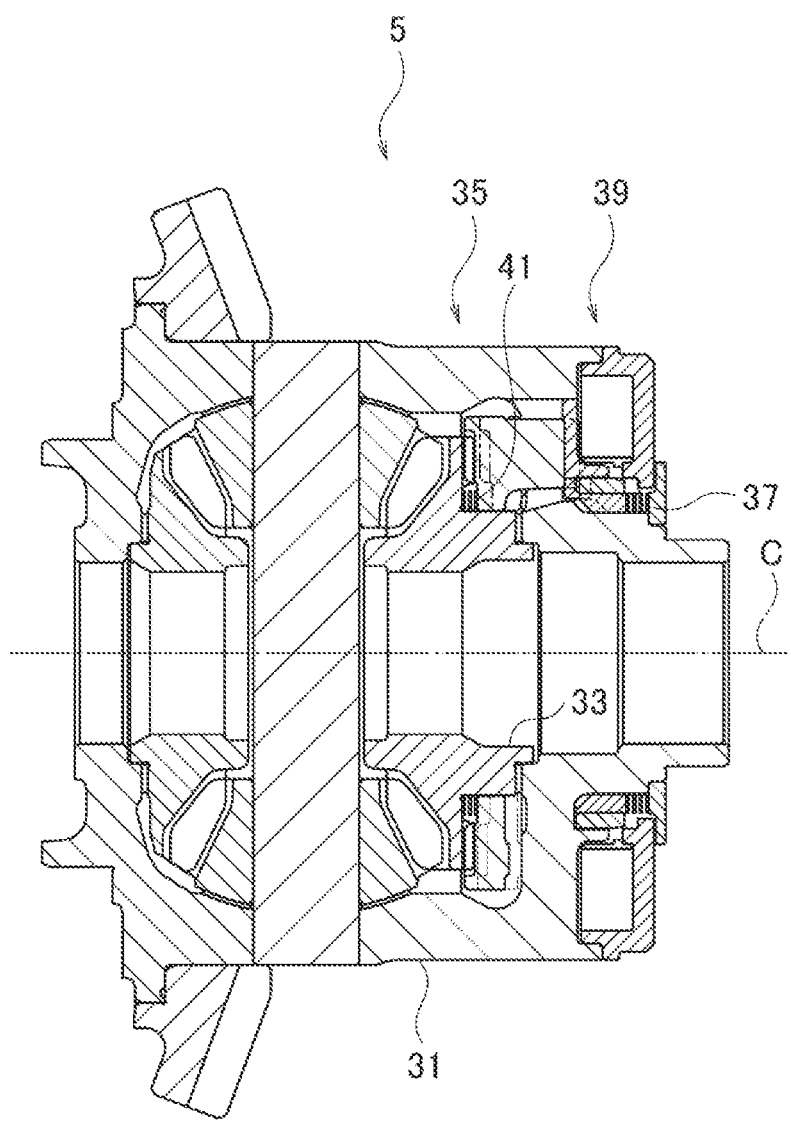
FIG. 2 is an elevational sectional view of a final drive according to an example.

Referring to FIG. 2, the final drive 5 is generally provided with a casing 31 that receives torque generated by the motor 3, a differential gear provided with a pair of side gears 33, a clutch 35 that, when in mesh, locks differential motion between the side gears 33, and a bias means 37 for biasing the clutch 35 to be in mesh together. The casing 31 is, by means of a sprocket or gearings, drivingly coupled to the motor 3 to receive its torque and thereby rotates about an axis C. The casing 31 and the pair of side gears 33 are drivingly coupled together via the differential gear set and thereby the received torque is output through the side gears 33 to the driving wheels 1R.

In the present embodiment, the clutch 35 fixes one of the side gears 33 with the casing 31 to lock differential motion between the side gears 33; locking of differential motion may be realized by any other proper structures. As will be readily understood, while the device has a structure similar to a so-called lock-up differential, the clutch 35 continuously stands engaged by means of the bias means 37 and therefore in the steady state prohibits differential motion between the right and left side gears 33. Only when an actuator 39 is powered and then goes into operation, is the clutch 35 disengaged and the lock released to put the differential gear into operation, thereby allowing the differential motion between the right and left side gears 33. More specifically, the device is a normally-closed (or continuously locking)

lock-up differential. In the final drive 5, needless to say, when the electric power is lost, the clutch 35 is engaged again by means of the function of the bias means 37 and the device maintains the steady state to lock the differential motion.

In addition to the bias means 37, the final drive 5 may be, although is not necessarily, provided with any other bias means 41 for biasing the clutch member in the counter direction thereto. This reduces a load the actuator 39 should bear, thereby beneficially reducing energy consumption.

Alternatively, in place of the aforementioned normally-closed lock-up differential, a differential where a latch mechanism or such maintains the lock-up state is possible. Alternatively, a temporarily disengageable device such as a shift device may be used.

Referring again to FIG. 1, the vehicle is provided with a brake 7 for braking, which may be housed in the motor 3 and combined with its rotor shaft. Alternatively, or additionally, the vehicle may be provided with drum or disk brakes installed on respective wheels. Yet further alternatively, the brake 7 may be an electromagnetic brake, which may be used not only for braking the vehicle but also for electric power regeneration. Even when power is applied, as well when power is lost, the motor 3 and the electromagnetic brake may apply a load to the rotor shaft to brake the vehicle. The brake 7 may also include a mechanical brake that is spring-loaded to work when the power is lost. Such a mechanical brake can brake or lock the rotor shaft.

The system of the present embodiment is, in addition to the aforementioned structure, generally provided with a controller 11, an accelerator pedal 13, a brake pedal 15, an ignition key 17, a differential-lock switch 19, a battery 21, and a switching unit 29. The accelerator pedal 13, the brake pedal 15, the ignition key 17, and the differential-lock switch 19 are input devices all electrically connected to the controller 11, and the driver can use these devices to give commands to the controller 11 for executing operation of the vehicle in various ways such as start-up, starting, acceleration, braking, stopping, and parking. The battery 21 supplies electric power to the motor 3 to function as a power source for the vehicle but is also electrically connected via the switching unit 29 to the actuator 39 in the final drive 5 and can power its operation, and can further supply electric power to the controller 11.

The ignition key 17 is for example a rotary switch to select whether the system is turned on or off, and at least has an ON position and an OFF position. The switch may be a type in which a key is inserted in a keyhole to turn it, or may be a dial without a keyhole. The ignition key 17 may as well double as a shifter, a shift lever or a selector. In the latter case, its ON position includes a neutral position N and a drive position at least, and the drive position may include a forward position F and a rearward position R. The forward position F may as well be divided into plural steps and may further include other positions. The shifter, the shift lever or the selector may be independent of the ignition key 17, of course.

The differential-lock switch 19 is a switch such as a toggle switch, a push button or a slide switch in use for operation of the clutch 35, and at least has an open position OP and a closed position CL. Although details will be described later, if the differential-lock switch 19 is in the open position OP, the differential motion in the final drive 5 is allowed, but the differential motion is locked if in the closed position CL. The differential-lock switch 19 may be independent of the ignition key 17 and the other switches as shown in the drawings, or may be integrated with these switches.

The system may be further provided with an indicator for showing whether the differential motion is locked or not. The indicator may be an illumination built in the differential-lock switch 19 or any indicator separated from the switch 19. Of course, in place of or in addition to the indicator, any display device using liquid crystal, organic light-emission diode, or laser projection, and symbols or icons indicated on the display device may be used to show lock/unlock of the differential motion. Further alternatively or additionally, any reminder sound emitted by any acoustic device such as a speaker may be used.

The battery 21 is a main power source of the vehicle and, in accordance with on/off switching by the ignition key 17, supplies or stop electric power to respective components of the vehicle. The battery 21 is a secondary battery such as a lithium ion battery for example, but may be a primary battery or a battery such as a fuel cell that has an ability to by itself generate electricity. In a case of the secondary battery, it is usually subject to recharge by an external power source but instead the vehicle may be structured as a so-called hybrid vehicle that has a generator for itself and is to be recharged while the vehicle running.

The system may be provided with a battery charger 23 for recharging the battery 21 and the controller 11 may have a function for controlling the same. The battery charger 23 may be connected to an external charger PS and can receive power supplied therefrom to charge the battery 21. The battery charger 23 may also receive power from an on-board generator in place of, or in addition to, the external charger PS.

In order to provide high power, the battery 21 has a relatively high rated voltage such as 48V, while the system may be further provided with a sub-battery 25 having a lower rated voltage. The sub-battery 25 has a rated voltage such as 12V for example and may be used mainly for powering relatively low-power electric components. The controller 11, for example, is usually powered by the sub-battery 25.

While the sub-battery 25 receives power supply from the battery 21 for example, a DC-DC converter 27 may be used for the purpose of stepping down from 48V to 12V and the controller 11 may have a function for controlling the step-down.

The switching unit 29 is electrically connected to the controller 11 and is, under control thereby, switched on and off to control power input to the actuator 39. To the switching unit 29 applicable is a so-called relay, which may be of course any of an electromagnetic relay, a lead relay, a solid-state relay or any equivalents. Or, in place of the relay, any power semiconductor for controlling electric power such as a thyristor, an insulated-gate bipolar transistor or a MOS-FET is possible.

The switching unit 29 is interposed between the battery 21 or the sub-battery 25 and the actuator 39 to control input of electric power to the actuator 39. The switching unit 29 may be outside the controller 11 as shown by solid lines in FIG. 1 but may be built in the controller 11 as shown by broken lines. In the case where it's built-in, the controller 11 substantially, or at least functionally, controls the actuator 39 directly.

When the switching unit 29 is open, as the power is not applied to the actuator 39, the clutch 35 is connected so that the differential motion in the final drive 5 is locked. When the switching unit 29 is closed, the actuator 39 is put into operation to make the clutch 35 open, thereby allowing the differential motion.

The controller 11 can include a computer chip working in cooperation with software, which is so configured as to execute a series of processes as described later. An example of the computer chip is an electronic control unit (ECU), or any equivalent thereof, with which a vehicle is provided to control its various components, and a plurality of ECUs may be connected with each other via controller area network (CAN) communication buses. Or, a part of or the whole of the series of processes described later may be executed not by software or by any combination of logic circuits of AND, OR, NOT and the like. More specifically, a part of, or the whole of, the controller 11 may be circuits so configured as to control electric power input and cut-off to the motor 3, the brake 7 and the actuator 39. The circuits may be either fixed or programmable.

Figure 3:
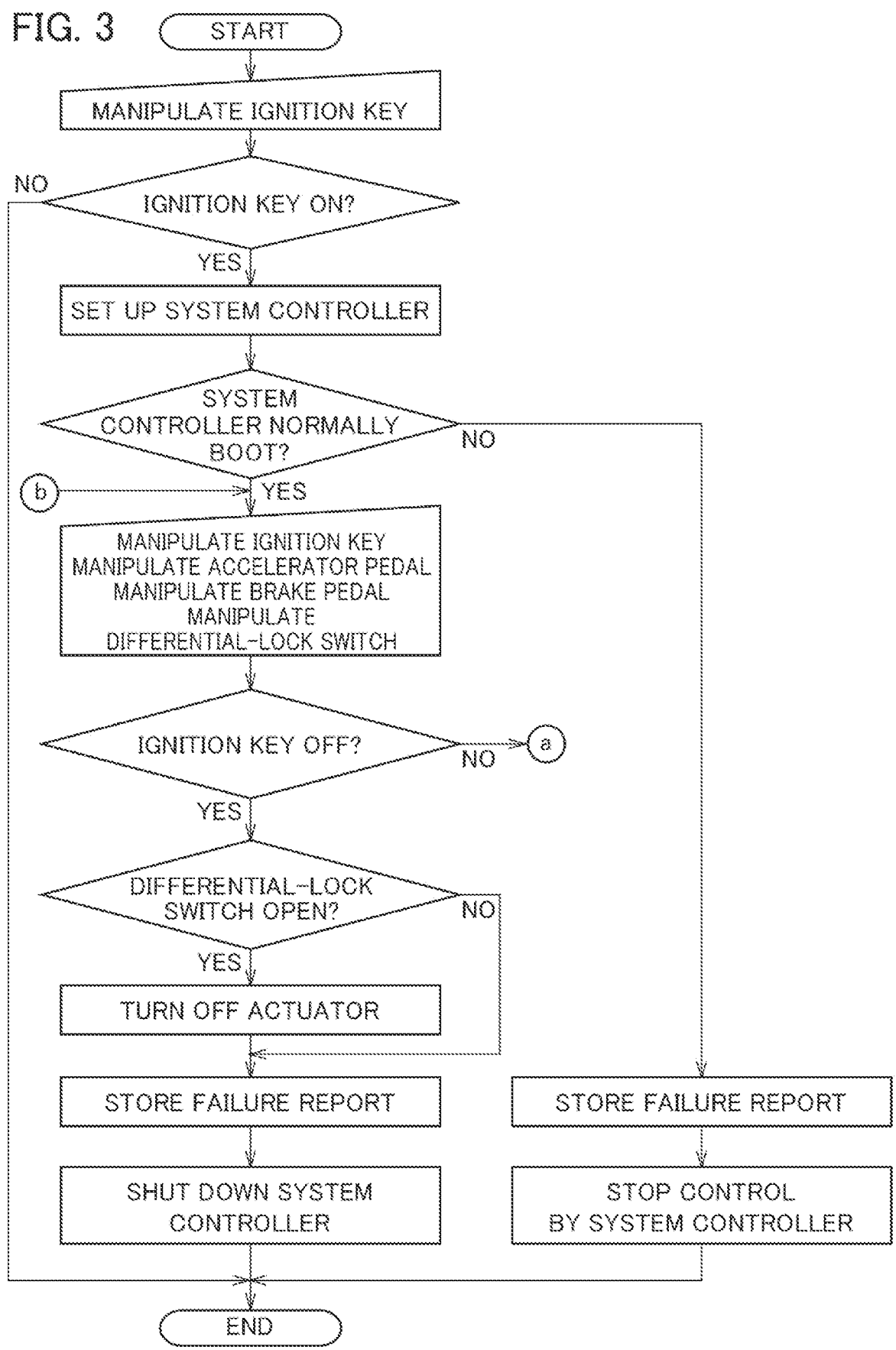
FIG. 3 is a flowchart of an algorithm constituting the system.

The controller 11 runs in accordance with the algorithm shown in FIG. 3, for example, thereby assisting the driver about start-up, starting, acceleration, braking, stopping, and parking. The algorithm may be executed by the single controller 11 but may be executed in cooperation with other ECUs. Further, for the purpose of execution of these controls, the controller 11 may be electrically connected directly and/or via any other ECUs to various sensors such as a vehicle speed sensor, shaft speed sensors, or position sensors of clutches.

Referring to FIG. 3, at a time of starting up the vehicle, the driver first manipulates the ignition key 17 to switch it ON. When the ignition key 17 is in the ON position, the controller 11 is booted up and executes predetermined setup processes. When the ignition key 17 fails to go into the ON position, it executes no processes and then the driver should manipulate the ignition key 17 again or check up the vehicle.

The controller 11 may next execute self-tests. If the controller resultantly finds any failure, it may store a failure report and halt itself. The failure report may be announced to the driver and, for this purpose, any indicator, an image display device or an acoustic device may be used. Also in this case, the driver should check up the vehicle.

If the controller 11 normally succeed in booting up through these processes, the driver is allowed to start driving the vehicle. The controller 11, in accordance with manipulation of the accelerator pedal 13, the brake pedal 15, the ignition key 17 and the differential-lock switch 19, controls the motor 3, the brake 7 and the switching unit 29 (thereby the clutch 35) to properly head, brake and stop the vehicle.

In continuing driving, the controller 11 continuously, or periodically, keeps monitoring whether the ignition key 17 is in the OFF position. It could be supposed that the driver intends to keep driving the vehicle if the key is not in the OFF position.

Figure 4:
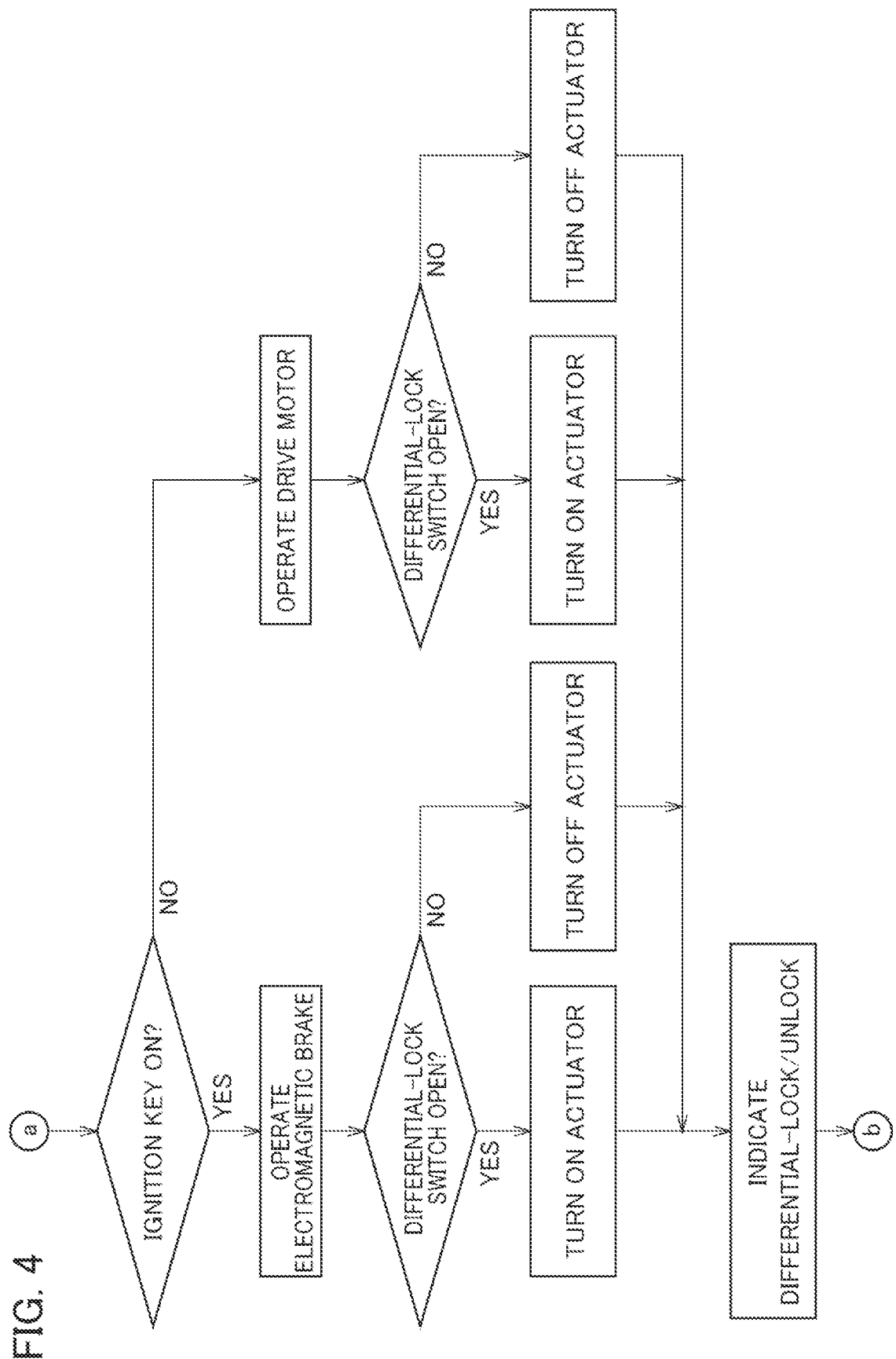
FIG. 4 is a part of the flowchart pertaining to a process while operating a vehicle.

Processes when the ignition key 17 is not in the OFF position will be explained with reference to FIG. 4. The controller 11 further determines whether the ignition key 17 (or, the shifter, the shift lever or the selector) is in the neutral position N or not.

If the key 17 is in the neutral position N, as it could be supposed that the driver intends to temporarily park the vehicle, the controller 11 puts the brake 7 into operation to stop the vehicle. The controller 11 next determines whether the differential-lock switch 19 is in the open position OP or not. The controller 11, if it is determined that the differential-lock switch 19 is in the open position OP, turns on the actuator 39 (connect the switch unit 29) to allow the differential motion, but, if the switch 19 is not in the open position OP (namely is in the closed position CL), turns off the actuator 39 (cut off the switch unit 29) to lock the differential motion.

If the key 17 is not in the neutral position N (namely, is in the forward position or the backward position), as it could be supposed that the driver still intends to run the vehicle, the controller 11 keeps the motor 3 in operation. The controller 11 then, if it is determined that the differential-lock switch 19 is in the open position OP, switches on the actuator 39 (connect the switch unit 29) to allow the differential motion, but, if the switch 19 is not in the open position OP (namely is in the closed position CL), switches off the actuator 39 (cuts off the switch unit 29) to lock the differential motion.

In either case, the controller 11 may announce to the driver whether the differential motion is locked/unlocked, and such notice may, as described already, be made by the indicator, the image display device or the acoustic device. The control goes back to "b" in FIG. 3 and the driver can continue driving. The driver may, at his/her discretion on the basis of the condition of the road, manipulate the differential-lock switch 19 to select availability of the differential motion and then keep running the vehicle.

Referring again to FIG. 3, when the driver intends to park the vehicle, the driver first may press down the brake pedal 15 to put the brake 7 into operation and then stop the vehicle. Then the controller 11 may use the vehicle speed sensor to determine whether the vehicle stops.

As described already, the controller 11 continuously, or periodically, keeps monitoring whether the ignition key 17 is in the OFF position. The controller 11, upon determining that the ignition key 17 is in the OFF position, next determines whether the differential-lock switch 19 is in the open position OP or not. The controller 11, if upon a determination of the open position OP, turns off the actuator 39 (cut off the switch unit 29) in contradiction to the instruction by the differential-lock switch 19. Alternatively, the controller 11 may forcibly set the differential-lock switch 19 into the closed position CL. Yet further alternatively, the controller 11 may directly control the battery 21 (or the sub-battery 25) to cut off power supply to the actuator 39. In any case, the clutch 35 is closed (connected) to lock the differential motion.

On the other hand, upon a determination that the switch 19 is not in the open position OP (namely, is in the closed position CL), as the clutch 35 is supposed to be closed (connected) already, the controller 11 executes no operation of the actuator 39 (or the switch unit 29). Of course, the controller 11 may explicitly turn the actuator 39 OFF (cut off the switch unit 29), or cut off power supply from the battery 21 (or the sub-battery 25).

In any case, as the differential motion by the final drive 5 is locked, the vehicle should not move or turn and can be safely parked. Next the controller 11 shuts itself down.

According to the system described above, as the clutch 35 for locking the differential motion is steadily closed every time the vehicle is to be parked, the vehicle is prevented from turning around and can be thus safely parked only by braking the rotor shaft mainly. More specifically, the system does not require any means such as a parking brake for locking the driving wheels. Further the system, as using the normally-closed differential, does not require electric power to lock the differential motion and therefore does not exhaust the battery during parking. The present embodiment is superior in reduction in weight and low electric power consumption and thus provides large benefits particularly when used for relatively light-weight and battery-driven vehicles. Of course, in place of the normally-closed differential, also applicable is any device for locking differential motion when power supply is lost.

Although certain exemplary embodiments are described above, modifications and variations of the embodiments will occur to those skilled in the art, in light of the above teachings.

What is claimed is:

1. A parking system, comprising:
a torque-generating motor;
a final drive including side gears so coupled with the motor as to output torque from the motor to respective driving wheels of a vehicle, and including a differential gear with a lock to prevent a differential motion between the side gears, and an actuator for releasing the lock;
an ignition key having an ON position and an OFF position; a differential-lock switch having an open position and a closed position; a switching unit for selecting whether the actuator is turned on or off;
a controller electrically connected to the ignition key, the differential-lock switch, and the switching unit to control the actuator, the controller configured to, when the ignition key is detected to be in the OFF position, turn off the actuator if the differential-lock switch is in the open position, and execute no operation about the actuator if the differential-lock switch is in the closed position, whereby the differential motion of the differential gear is locked in either case to park the vehicle;
a shifter at least having a drive position and a neutral position; and
a brake for braking the motor, wherein the controller is electrically connected to the shifter and the brake and configured to
put the brake into operation if the ignition key is in the ON position and the shifter is in the neutral position.

2. The parking system of claim 1, wherein the controller is configured to, after putting the brake into operation, turn on the actuator if the differential-lock switch is in the open position and turn off the actuator if the differential-lock switch is in the closed position.

3. The parking system of claim 1, wherein the controller is electrically connected to the motor and configured to turn on the motor only if the ignition key is in the ON position and the shifter is in the drive position.

4. The parking system of claim 3, wherein the controller is configured to, after turning on the motor, turn on the actuator if the differential-lock switch is in the open position and turn off the actuator if the differential-lock switch is in the closed position.

\* \* \* \* \*